(12) United States Patent
Hu et al.

(10) Patent No.: US 12,346,759 B2
(45) Date of Patent: Jul. 1, 2025

(54) PAYMENT CARDS WITH ACTIVATED INFORMATION DISPLAYS

(71) Applicant: JPMORGAN CHASE BANK, N.A., New York, NY (US)

(72) Inventors: Shaohan Hu, Yorktown Heights, NY (US); Youngwook Do, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/510,314

(22) Filed: Nov. 15, 2023

(65) Prior Publication Data

US 2025/0156671 A1    May 15, 2025

(51) Int. Cl.
*G06K 19/077*    (2006.01)

(52) U.S. Cl.
CPC . *G06K 19/07722* (2013.01); *G06K 19/07703* (2013.01)

(58) Field of Classification Search
None
See application file for complete search history.

*Primary Examiner* — Suezu Ellis
(74) *Attorney, Agent, or Firm* — GREENBERG TRAURIG LLP

(57) ABSTRACT

Payment cards with activated information displays are described. In one embodiment, a payment card may include: a first layer; a second layer comprising an elastic material; an actuator; and an information layer between the first layer and the second layer, comprising: a plurality of information voids; and a microfluidic channel that communicates the plurality of information voids with the actuator. A fluid may be provided in the microfluidic channel such that when the actuator is depressed, fluid flows into the information voids making the information voids visible through the second layer, and when the actuator is released, the fluid flows out of the information voids making the information voids substantially invisible through the second layer.

12 Claims, 6 Drawing Sheets

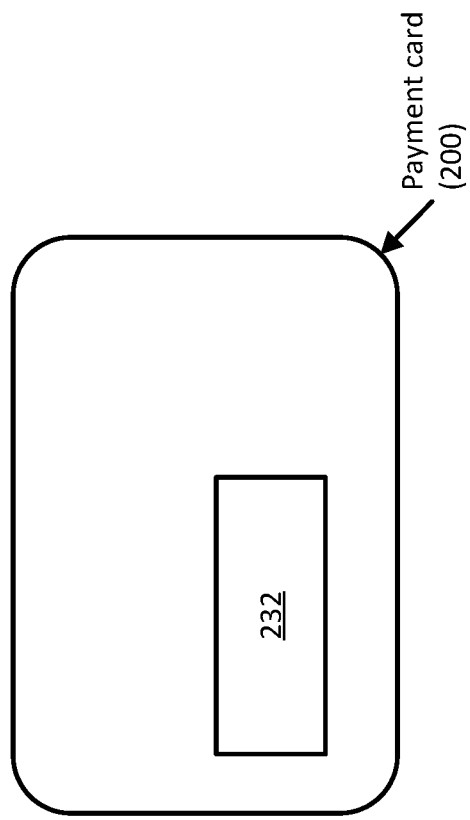
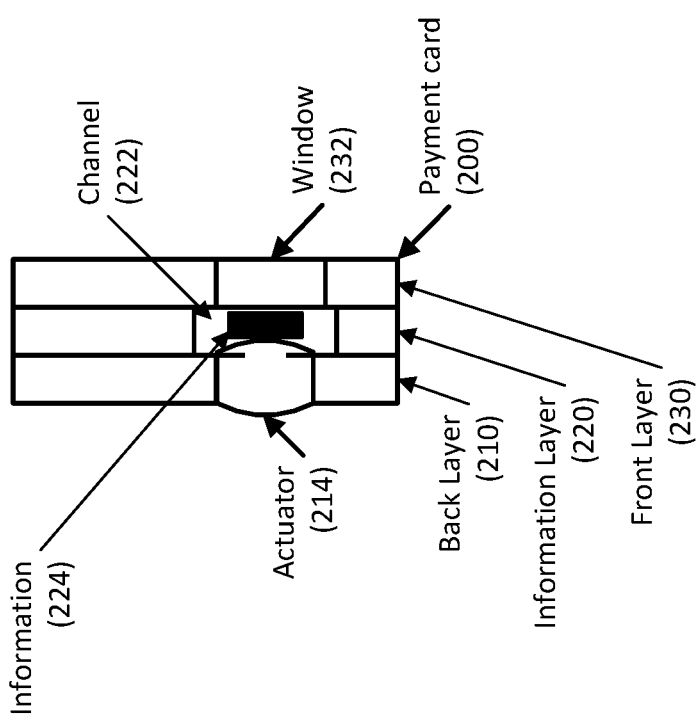
FIGURE 2B
FIGURE 2A

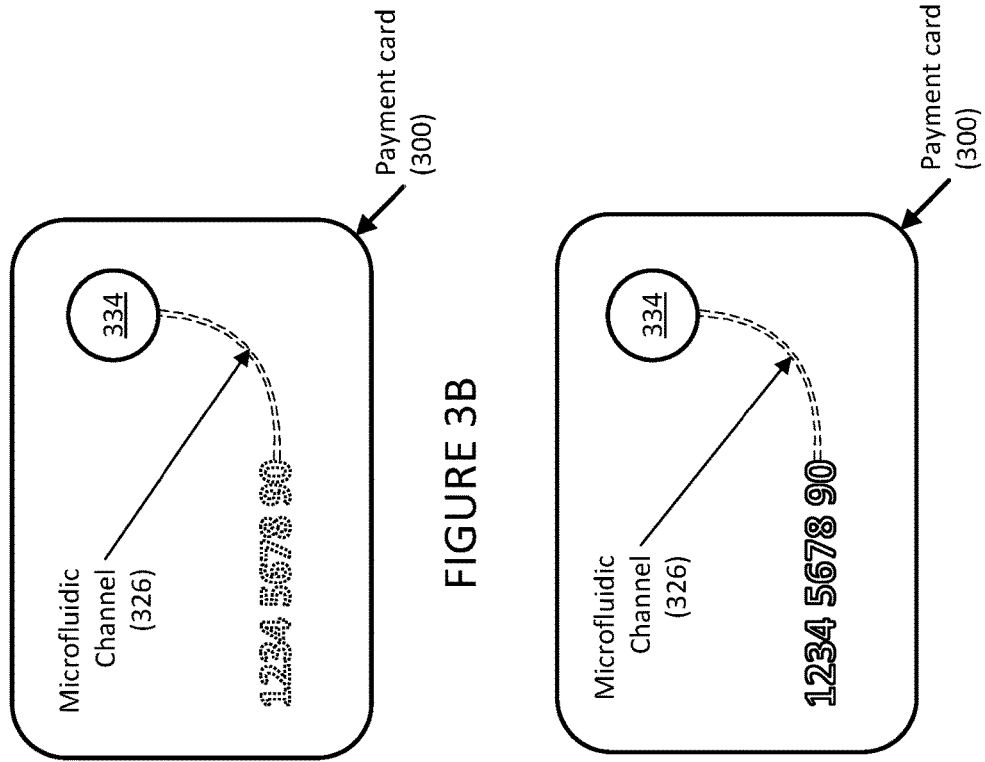
FIGURE 3B
FIGURE 3C
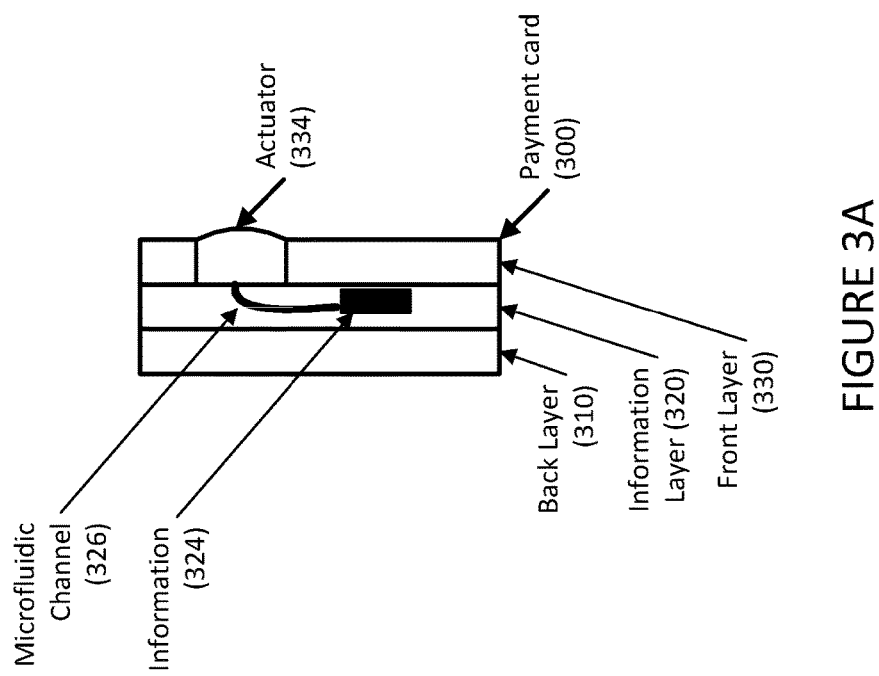
FIGURE 3A

PAYMENT CARDS WITH ACTIVATED INFORMATION DISPLAYS

BACKGROUND OF THE INVENTION

1. Field of the Invention

Embodiments relate to payment cards with activated information displays.

2. Description of the Related Art

Payment cards, such as credit cards or debit cards, often have their account number embossed on the front or back of the substrate. This makes the account number, as well as other information, such as the cardholder name, expiration date, and in some cases, the card verification value (CVV) susceptible to capture by a shoulder surfer. While credit cards with powered displays have been proposed, these displays require a power source and often change the form factor of the card so that it is no longer ISO-compatible.

SUMMARY OF THE INVENTION

Payment cards with activated information displays are disclosed. In one embodiment, a payment card may include: a first layer; a second layer comprising an elastic material; an actuator; and an information layer between the first layer and the second layer, comprising: a plurality of information voids; and a microfluidic channel that communicates the plurality of information voids with the actuator. A fluid may be provided in the microfluidic channel such that when the actuator is depressed, fluid flows into the information voids making the information voids visible through the second layer, and when the actuator is released, the fluid flows out of the information voids making the information voids substantially invisible through the second layer.

In one embodiment, the actuator may be in the first layer.

In one embodiment, the actuator may include a reservoir in communication with the microfluidic channel.

In one embodiment, the fluid may include a gas or a liquid.

In one embodiment, the plurality of information voids have a numeric shape.

According to another embodiment, a payment card may include: a first layer; a second layer comprising a window of a translucent material; an actuator; and an information layer between the first layer and the second layer, comprising: a channel comprising information, wherein the information is biased toward the first layer; and a passage that communicates the channel with the actuator. A fluid may be provided in the channel and in the passage such that when the actuator is depressed, fluid flows into the channel and presses the information against the window making the information visible through the window, and when the actuator is released, the fluid flows out of the channel making the information substantially invisible through the window.

In one embodiment, the actuator may be in the first layer.

In one embodiment, the actuator may include a reservoir in communication with the channel via the passage.

In one embodiment, the fluid may include a gas or a liquid.

In one embodiment, the information may include numbers.

According to another embodiment, a method may include: (1) providing a payment card with a plurality of information voids below a surface comprising of the payment card; (2) actuating an actuator on the payment card, wherein the actuation causes fluid to travel through a microfluidic channel into the information voids, causing the information voids to expand and be visible through the surface of the payment card; and (3) releasing the actuator, wherein the release causes the fluid to flow out of the information voids, causing the information voids to contract and become substantially invisible through the surface of the payment card.

In one embodiment, the surface may include an elastic material.

In one embodiment, the elastic material causes the information voids to contract when the actuator is not actuated.

In one embodiment, the fluid may include a gas or a liquid.

In one embodiment, the plurality of information voids have numeric shapes.

BRIEF DESCRIPTION OF THE DRAWINGS

For a more complete understanding of the present invention, the objects and advantages thereof, reference is now made to the following descriptions taken in connection with the accompanying drawings in which:

FIGS. 2A and 2B illustrate a payment card with an activated information display according to another embodiment;

FIGS. 3A, 3B, and 3C illustrate a payment card with an activated information display according to another embodiment;

DETAILED DESCRIPTION OF PREFERRED EMBODIMENTS

Embodiments relate to payment cards with activated information displays.

Figure 1B:
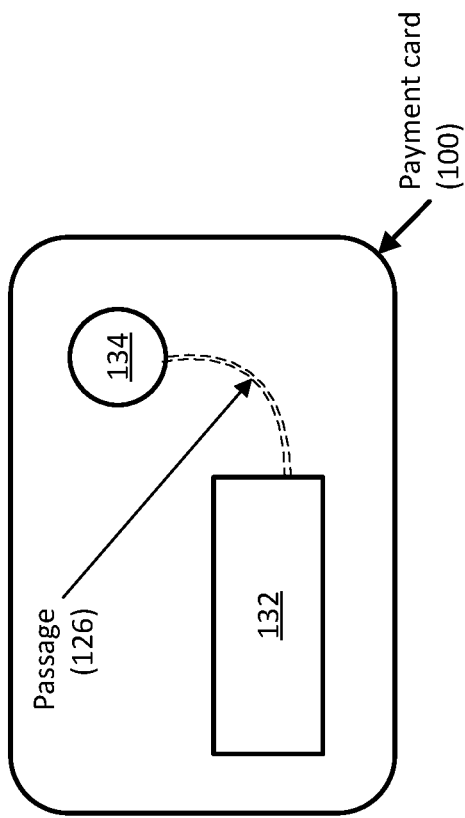
FIGS. 1A and 1B illustrate a payment card with an activated information display according to an embodiment.
Figure 1A:
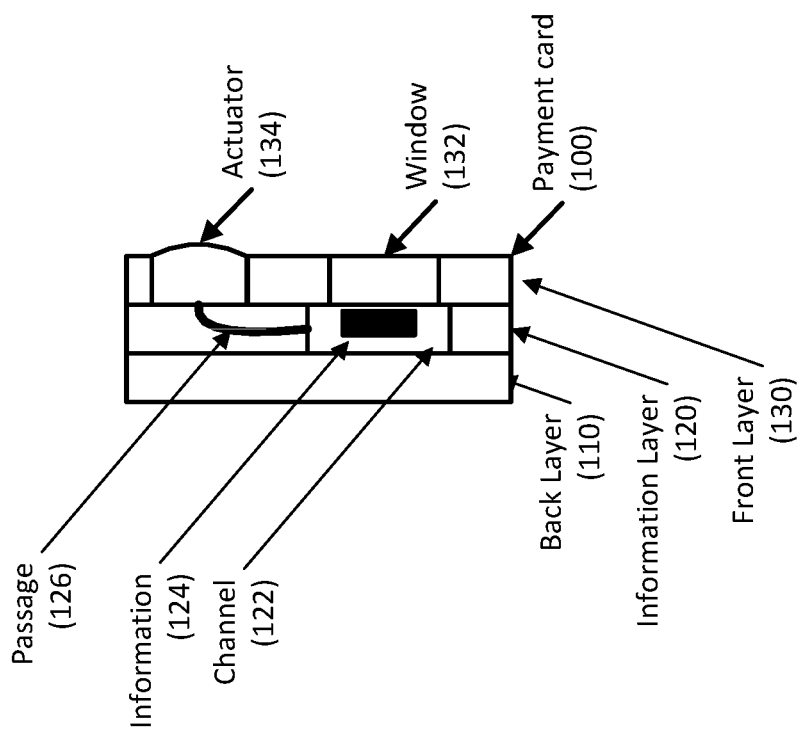

Referring to FIGS. 1A and 1B, a payment card with an activated information display is disclosed according to an embodiment. Payment card 100 may comprise a laminate for a plurality of layers. For example, payment card 100 may include back layer 110, information layer 120, and front layer 130. Each layer 110, 120, 130 may be made of any suitable material, including plastics.

In embodiments, information layer 120 may be part of back layer 110 or front layer 130. Thus, back layer 110 and front layer 130 may be sealingly connected, which information layer 120 therebetween.

Information layer 120 may include channel 122 that may be provided with a fluid, such as a liquid (e.g., water), a gas (e.g., air), etc. Channel 122 may include information 124, such as some or all numbers of a payment card number, a cardholder name, an expiration date, and/or a CVV. Information 124 may be biased toward back layer 110 such that it normally is not in contact with window 132. For example, one or more springs (not shown) may be provided to bias information 124.

In one embodiment, channel 122 may surround information 124. For example, information 124 may be suspended or may float in channel 122.

Passage 126 may provide a fluid communication channel between channel 122 and actuator 134 so that when actuator 134 is depressed, fluid from actuator 134 and passage 126 is forced into channel 122, which causes information 124 in channel 122 to be pressed against window 132, thereby making information 124 visible through window 132. When actuator 134 is released, fluid in channel 122 returns to actuator 134 and passage 126, and information 124 moves away from window 132, and is not visible, or is more difficult to see.

Actuator 134 may comprise a reservoir (not shown) for receiving the fluid from channel 122. Actuator 134 may be provided in back layer 110 or in front layer 130.

Window 132 may be a translucent material that may be provided in a part of front layer 130. As noted above, when information 124 is not in contact with window 132, or pressed against window 132, information 124 is not visible, or may be not easy to see.

Referring to FIGS. 2A and 2B, a payment card with an activated information display is disclosed according to another embodiment. Payment card 200 may comprise a laminate for a plurality of layers. For example, payment card 200 may include back layer 210, information layer 220, and front layer 230. Each layer 210, 220, 230 may be made of any suitable material, including plastics.

In embodiments, information layer 220 may be part of back layer 210 or front layer 230. Thus, back layer 210 and front layer 230 may be sealingly connected, which information layer 220 therebetween.

Information layer 220 may include channel 222 that may be provided with a fluid, such as a liquid (e.g., water), a gas (e.g., air), etc. Channel 222 may include information 224, such as some or all numbers of a payment card number, a cardholder name, an expiration date, and/or a CVV. Information 224 may be biased toward back layer 210 such that it normally is not in contact with window 232. For example, one or more springs (not shown) may be provided to bias information 224.

In one embodiment, channel 222 may surround information 224.

When actuator 214 is depressed, fluid from actuator 214 is forced into channel 222, which causes information 224 in channel 222 to be pressed against window 232, thereby making information 224 visible through window 232. When actuator 214 is released, fluid in channel 222 returns to actuator 214 and information 224 moves away from window 232, and is not visible, or is more difficult to see.

Window 232 may be a translucent material that may be provided in a part of front layer 230. As noted above, when information 224 is not in contact with window 232, or pressed against window 232, information 224 is not visible, or may be not easy to see.

Referring to FIGS. 3A. 3B, and 3C, a payment card with an activated information display is disclosed according to another embodiment. Payment card 300 may comprise a laminate for a plurality of layers. For example, payment card 300 may include back layer 310, information layer 320, and front layer 330. Each layer 310, 320, 330 may be made of any suitable material, including plastics.

An example of an elastic material is polyethylene.

Information layer 320 may include information 324, such as some or all numbers of a payment card number, a cardholder name, an expiration date, and/or a CVV. Information 324 may be provided as information voids that may be inflated or filled with a fluid, such as a liquid (e.g., water), a gas (e.g., air), etc.

In one embodiment, the information voids may be an elastic material that expands when filled with a fluid, and contract when the fluid is not present. The information voids may be biased toward the contracted state.

In another embodiment, information 324 may be provided in a rigid material, such as an acrylic sheet. The numbers, letters, characters, etc. may be cut as voids into the acrylic sheet using, for example, laser cutting. Microfluidic channel 326 may be created in the same manner.

In embodiments, information layer 320 may be part of back layer 310 or front layer 330. Thus, back layer 310 and front layer 330 may be sealingly connected, which information layer 320 therebetween.

Some or all of front layer 330 may be an elastic material. In one embodiment, when actuator 334 is depressed, fluid is forced into information 324 via microfluidic channel 326, which causes information 324 to inflate or expand. Due to the elastic material in front layer 330, information 324 will then be visible through front layer 330. When actuator 334 is released, the fluid flows out of information 324 and information deflates or contracts, and is no longer visible, or is more difficult to see, through front layer 330.

Actuator 334 may comprise a reservoir (not shown) for receiving the fluid from microfluidic channel 326. Actuator 334 may be provided in back layer 310 or in front layer 330.

The elastic nature of front layer 330 may assist in forcing the fluid from information 324.

It should be noted that the location of actuator 334 and microfluidic channel 326 are exemplary only. Actuator 334 may be provided in back layer 310, front layer 330, in a side of payment card, etc.

FIG. 3B illustrates information 324 in a deflated or contracted state.

FIG. 3C illustrates information 324 in an expanded or inflated state.

Figure 4:
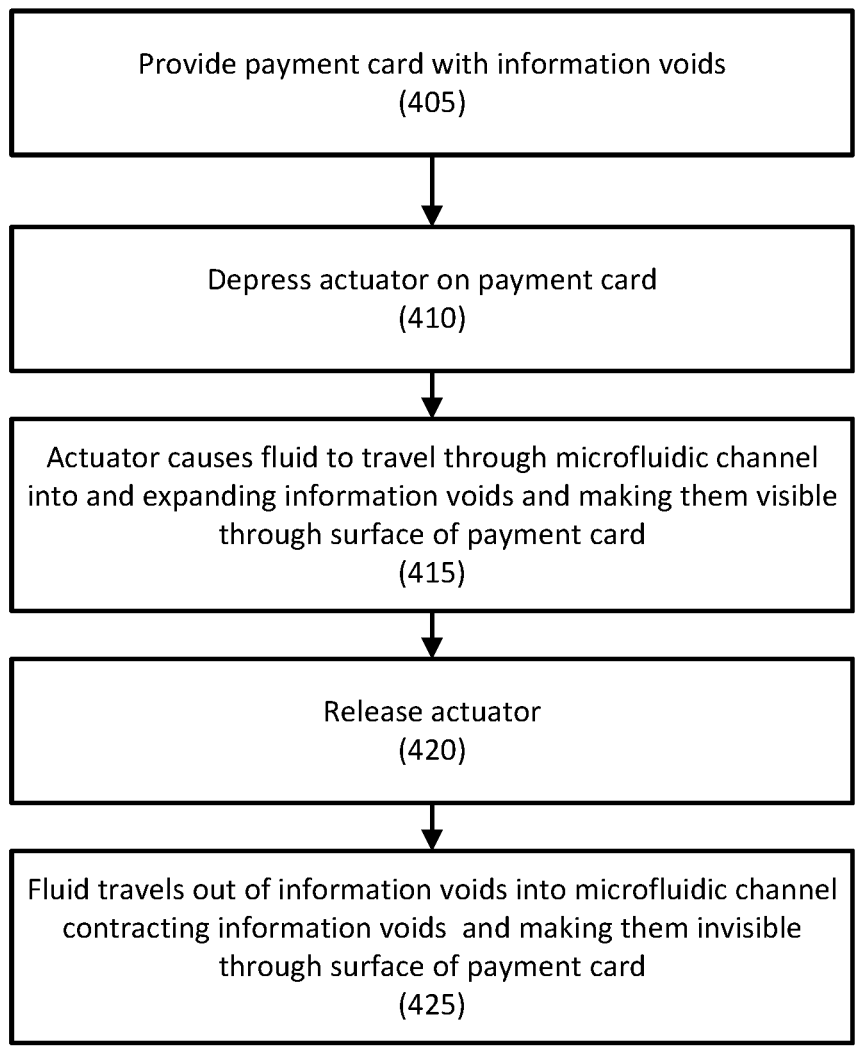
FIG. 4 illustrates a method for using a payment card with an activated information display according to an embodiment.

Referring to FIG. 4, a method of using a payment card with an activated information display is disclosed according to an embodiment.

In step 405, a payment card with information voids may be provided. An example is the payment card of FIGS. 3A/3B/3C.

In step 410, an actuator on the payment card may be depressed.

In step 415, the depressing of the actuator causes fluid to travel through a microfluidic channel into the information voids, which expands the information voids. The information voids may then press against an elastic material on the payment card making them visible.

In step 420, the actuator may be released.

In step 425, the fluid travels out of the information voids into microfluidic channel. This causes the information voids to contract, which makes them substantially invisible through material of the payment card.

In one embodiment, a valve or similar may regulate the flow of fluid out of the information voids so that the information voids contract at a desired speed. Thus, depressing the actuator may make the information voids visible for a period of time even if the actuator is released.

Figure 5:
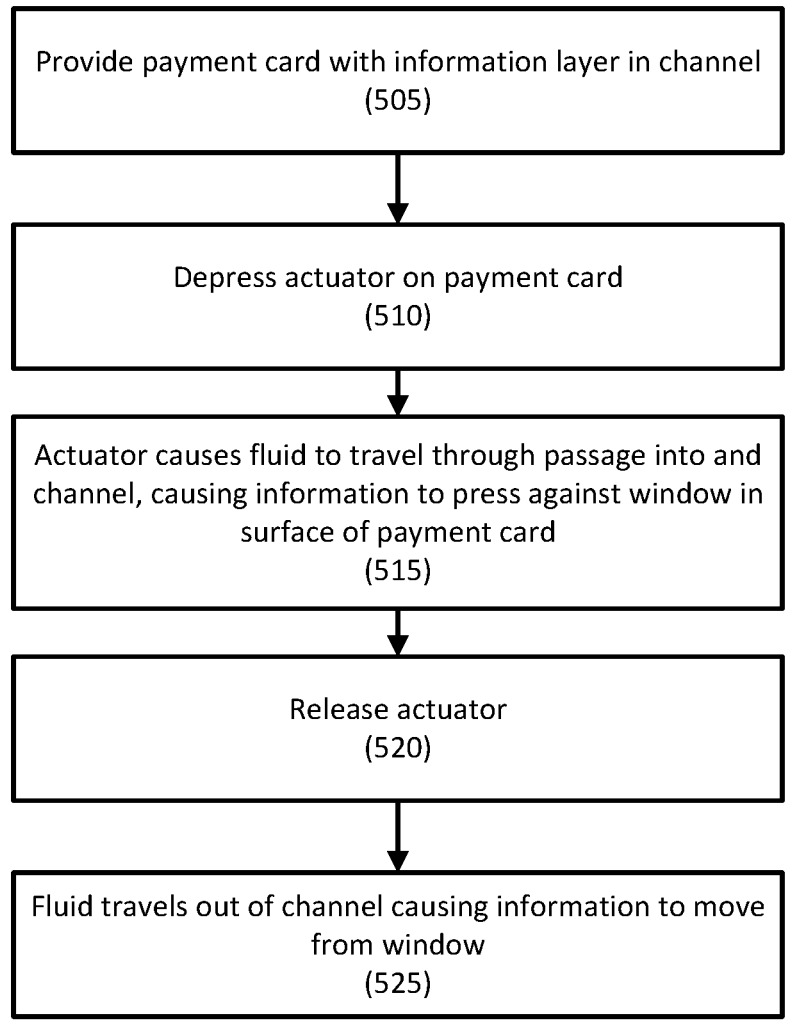
FIG. 5 illustrates a method for using a payment card with an activated information display according to another embodiment.

Referring to FIG. 5, a method of using a payment card with an activated information display is disclosed according to another embodiment.

In step 505, a payment card with information that may be "floating" in a channel may be provided. An example is the payment card of FIGS. 1A/1B, or FIGS. 2A/2B.

In step 510, an actuator on the payment card may be depressed.

In step 515, the depressing of the actuator causes fluid to travel through a passage and into the channel, causing the information to press against a window of a translucent material in a surface of the payment card. This makes the information visible.

In another embodiment, the actuator may mechanically interface with the information, and depressing the actuator may cause the information to move against the window.

In step 520, the actuator may be released.

In step 525, the fluid travels out of the channel into the passage. This causes the information to move away from the window, making substantially invisible through the window of the payment card.

In one embodiment, a valve or similar may regulate the flow of fluid out of the channel so that the information remains against the window for a desired amount of time. Thus, depressing the actuator may make the information visible for a period of time even if the actuator is released.

Figure 6:
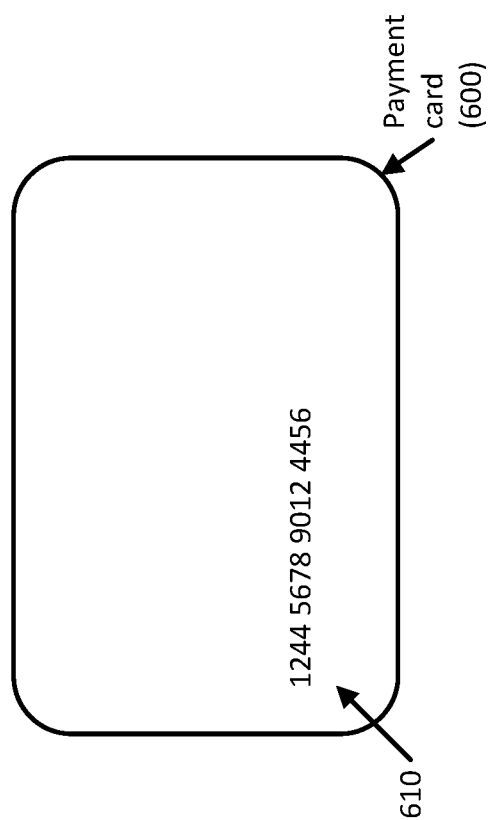
FIG. 6 illustrates a payment card with an activated information display according to another embodiment.

Referring to FIG. 6, a payment card with an activated information display is disclosed according to another embodiment. Payment card 600 may include information 610, such as some or all numbers of a payment card number, a cardholder name, an expiration date, and/or a CVV, that may be printed using a temperature-sensitive ink, such as thermochromic ink. Thus, in normal use, at least some of information 610 is not visible against the background of payment card 600. When heat is applied to information 610, such as by rubbing payment card 600 with a finger, exposing payment card to a heat source, etc., information 610 will change colors and be visible until the heat dissipates.

In another embodiment, information may be printed with invisible ink, such as an ink that is only visible under certain light wavelengths (e.g., fluorescing ink), such as ultraviolet light.

Hereinafter, general aspects of implementation of the systems and methods of embodiments will be described.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A payment card, comprising:
a first layer;
a second layer comprising an elastic material;
an actuator; and
an information layer between the first layer and the second layer, comprising:
a plurality of information voids; and
a microfluidic channel that communicates the plurality of information voids with the actuator;
wherein a fluid is provided in the microfluidic channel such that when the actuator is depressed, fluid flows into the information voids making the information voids visible through the second layer, and when the actuator is released, the fluid flows out of the information voids making the information voids invisible through the second layer.

2. The payment card of claim 1, wherein the actuator is in the first layer.

3. The payment card of claim 1, wherein the actuator comprises a reservoir in communication with the microfluidic channel.

4. The payment card of claim 1, wherein the fluid comprises a gas.

5. The payment card of claim 1, wherein the fluid comprises a liquid.

6. The payment card of claim 1, wherein the plurality of information voids have a numeric shape.

7. A method, comprising:
providing a payment card with a plurality of information voids below a surface comprising of the payment card;
actuating an actuator on the payment card, wherein the actuation causes fluid to travel through a microfluidic channel into the information voids, causing the information voids to expand and be visible through the surface of the payment card; and
releasing the actuator, wherein the release causes the fluid to flow out of the information voids, causing the information voids to contract and become invisible through the surface of the payment card.

8. The method of claim 7, wherein the surface comprises an elastic material.

9. The method of claim 8, wherein the elastic material causes the information voids to contract when the actuator is not actuated.

10. The method of claim 7, wherein the fluid comprises a gas.

11. The method of claim 7, wherein the fluid comprises a liquid.

12. The method of claim 7, wherein the plurality of information voids have a numeric shape.

* * * * *